United States Patent
Paker et al.

(10) Patent No.: US 11,558,074 B2
(45) Date of Patent: Jan. 17, 2023

(54) PROCESSING SIGNALS TO ACCOUNT FOR MULTIPATH-REFLECTION PHENOMENA IN RF COMMUNICATIONS

(71) Applicant: NXP B.V., Eindhoven (NL)

(72) Inventors: Özgün Paker, Waalre (NL); Arie Geert Cornelis Koppelaar, Giessen (NL)

(73) Assignee: NXP B.V., Eindhoven (NL)

( * ) Notice: Subject to any disclaimer, the term of this patent is extended or adjusted under 35 U.S.C. 154(b) by 239 days.

(21) Appl. No.: 16/878,381

(22) Filed: May 19, 2020

(65) Prior Publication Data
US 2021/0367633 A1    Nov. 25, 2021

(51) Int. Cl.
| | | |
|---|---|---|
| *H04B 1/10* | (2006.01) | |
| *H04B 1/719* | (2011.01) | |
| *H04L 5/00* | (2006.01) | |
| *H04L 25/02* | (2006.01) | |
| *H04L 27/26* | (2006.01) | |

(52) U.S. Cl.
CPC ........... *H04B 1/1081* (2013.01); *H04B 1/719* (2013.01); *H04L 5/0007* (2013.01); *H04L 25/0212* (2013.01); *H04L 27/2605* (2013.01)

(58) Field of Classification Search
CPC . H04L 5/0007; H04L 25/0212; H04L 25/022; H04B 1/1081; H04B 1/719
See application file for complete search history.

(56) References Cited

U.S. PATENT DOCUMENTS

| | | | |
|---|---|---|---|
| 8,351,526 B2 | 1/2013 | Butussi et al. | |
| 8,363,536 B2 | 1/2013 | Ma et al. | |
| 8,483,323 B2* | 7/2013 | Li | H04L 27/2647 375/316 |
| 8,488,690 B2 | 7/2013 | Carbonelli et al. | |
| 2010/0158141 A1 | 6/2010 | Hewavithana et al. | |
| 2013/0176877 A1* | 7/2013 | Sadek | H04W 16/14 370/252 |

FOREIGN PATENT DOCUMENTS

EP         2200238 A2 *  6/2010  ........... H04L 25/022

OTHER PUBLICATIONS

Yang, Channel Estimation for OFDM Transmission in Multipath Fading Channels Based on Parametric Channel Modeling, Mar. 2001, IEEE transactions on communication, vol. 49, No. 3 467-479 (Year: 2001).*
Pei-Yun Tsai et al., "Adaptive Raised-Cosine Channel Interpolation for Pilot-Aided OFDM Systems", IEEE Transactions on Wireless Communications, vol. 8, No. 2, Feb. 2009.

(Continued)

*Primary Examiner* — Elton Williams

(57) ABSTRACT

Aspects of the present disclosure may involve use of a radio frequency receiver and in such a receiver, tracking multipath gains and delays of multipath reflections corresponding to an OFDM multipath transmission channel. The gains and delays are based on time-domain evolution of the channel impulse response. Multipath reflections are searched for and then used to calculate channel correlation information to provide channel estimations to aid in mitigating or cancelling distortion of the received signal.

20 Claims, 9 Drawing Sheets

(56) References Cited

OTHER PUBLICATIONS

Digital Radio Mondiale (DRM); System Specification, ETSI ES201980, v4.1.2 (Apr. 2017).
Digital Video Broadcasting (DVB); Frame structure channel coding and modulation for a second generation digital terrestrial television broadcasting system (DVB-T2), ETSI EN 302 755 V1.3.1 (Apr. 2012).
Convergent Digital Radio (CDR) Specification: GY/T 268.1—2013 & GY/T 268.2 (2013).
Yang, B., "Channel Estimation for ODFM Transmission in Multipath Fading Channels Based on Parametric Channel Modeling", IEEE Transactions on Communications, vol. 49, No. 3., Mar. 2001.

* cited by examiner

PROCESSING SIGNALS TO ACCOUNT FOR MULTIPATH-REFLECTION PHENOMENA IN RF COMMUNICATIONS

Aspects of various embodiments are directed to RF (radio frequency) systems and more particularly to receivers which are to receive data carried by the RF signaling which use OFDM (orthogonal frequency division multiplexed) communications protocols. RF signaling of this type is susceptible to interference due to multipath reflections. Such multipath reflections may cause RF receiver performance issues such as dropped calls in cellular based phones, or poor browsing experience in computers due to poor router performance. The term multipath reflection stems from the phenomena of a transmitted RF signal being reflected from different and multiple surfaces before being received, and in this context, it is appreciated that this type of interference is less pronounced in rural areas and much more so in urban regions where buildings block the straight-line pathways of the RF signals.

There have been various approaches designed to mitigate this type of interference including those which monitor and measure the RF signaling channel(s) as part of the OFDM based receiving methodology. Estimation of the RF signals in certain of the channels may be used to provide some control over and minimization of the achievable rate of error in the digital signals which are unpacked or demodulated in RF receiver circuitry. Certain measures of this error rate include BER (Bit-Error-Rate) and SNR (Signal-to-Noise Ratio).

In such systems, for optimal time-domain interpolation one may access a channel covariance matrix to capture the channel properties in the time-direction. Some OFDM systems use a pre-calculated covariance matrix as opposed to estimating one. The pre-calculated covariance matrix corresponds to a power spectral density with an amount of Doppler spread. More generally, a channel covariance matrix refers to or involves a matrix used to monitor and correlate giving the joint variability, or "covariance" of parameters that may be associated with signals which appear to represent the same RF signal as received at different times due to the multipath reflection(s). In this regard, a channel covariance matrix may be implemented, for example, based on calculations which use a fixed Gaussian distribution model assumed to represent the received signals on the Doppler spread. Although time domain interpolations methods are helpful, there is still a need to further mitigate multipath impairments in OFDM systems.

Various example embodiments are directed to issues such as those addressed above and/or others which may become apparent from the following disclosure concerning the processing of an RF OFDM signal that can be impaired by one or more multipath reflections. In various more specific examples, mitigation of such impairment attributable to multipath reflection(s) may use a frequency domain interpolation technique which, optionally, can be coupled with any of a number of previously known time direction approaches.

In one example consistent with the present disclosure, a method includes circuitry in an RF receiver tracking multipath gains and delays of at least one of a plurality of multipath reflections corresponding to an orthogonal frequency division multiplexed (OFDM) signal received via a multipath transmission channel. This processing is based on time-domain evolution of channel impulse response data associated with the transmission channel. In response, a search is made for the multipath reflection(s) to calculate channel correlation information, or correlation functions, for providing channel estimations with mitigation or cancellation of distortion in the received signal.

In other more specific examples, the above type of method may further include calculating channel-dependent optimal frequency domain interpolation by using coefficients corresponding to gains and delays of each of a plurality of multipath reflections manifested by the OFDM signal, and/or further include providing a channel covariance matrix calculation per OFDM symbol of the received signal with an optimal set of interpolation coefficients in frequency direction associated with the covariance matrix calculation (to capture the channel behavior in the frequency domain), wherein the OFDM signal carries data in OFDM symbols, and further including tracking the multipath reflections over time. As noted above, such a covariance matrix calculation to capture the channel behavior in the frequency domain may optionally be used with a covariance matrix to capture the channel behavior in a time domain.

In a more specific example embodiment, aspects of the present disclosure may involve use of an RF (radio frequency) receiver for tracking multipath gains and delays of multipath reflections corresponding to an OFDM multipath transmission channel. The gains and delays may be based on time-domain evolution of the channel impulse response. Multipath reflections are searched for and, when found, are used to calculate channel correlation information to provide channel estimations to aid in mitigating or cancelling distortion of the received signal.

Another more specific example embodiment is directed to a method for calculating channel-dependent optimal frequency domain interpolation by using coefficients corresponding to gains and delays of each of the discovered multipath reflections manifested by the OFDM signal.

In yet another more specific example embodiment aspects are directed to a method wherein the OFDM signal carries data in OFDM symbols, and tracking of the multipath reflections over time. This tracking data provides a channel covariance matrix calculation per OFDM symbol of the received signal with an optimal set of interpolation coefficients in frequency direction associated with the covariance matrix calculation.

Another more specific example embodiment is directed to a method including identifying or determining existence of the multipath reflections based on a calculated relationship between a convolution output and detection of slopes associated with the multipath reflections. A multipath reflection is determined to exist if, in the multipath reflection, a positive slope is followed by a negative slope and the distance between these slopes equals a length of a filter used to smooth the multipath reflection.

The above discussion/summary is not intended to describe each embodiment or every implementation of the present disclosure.

BRIEF DESCRIPTION OF DRAWING

Various example embodiments may be more completely understood in consideration of the following detailed description in connection with the accompanying drawings, in which.

Figure 1:
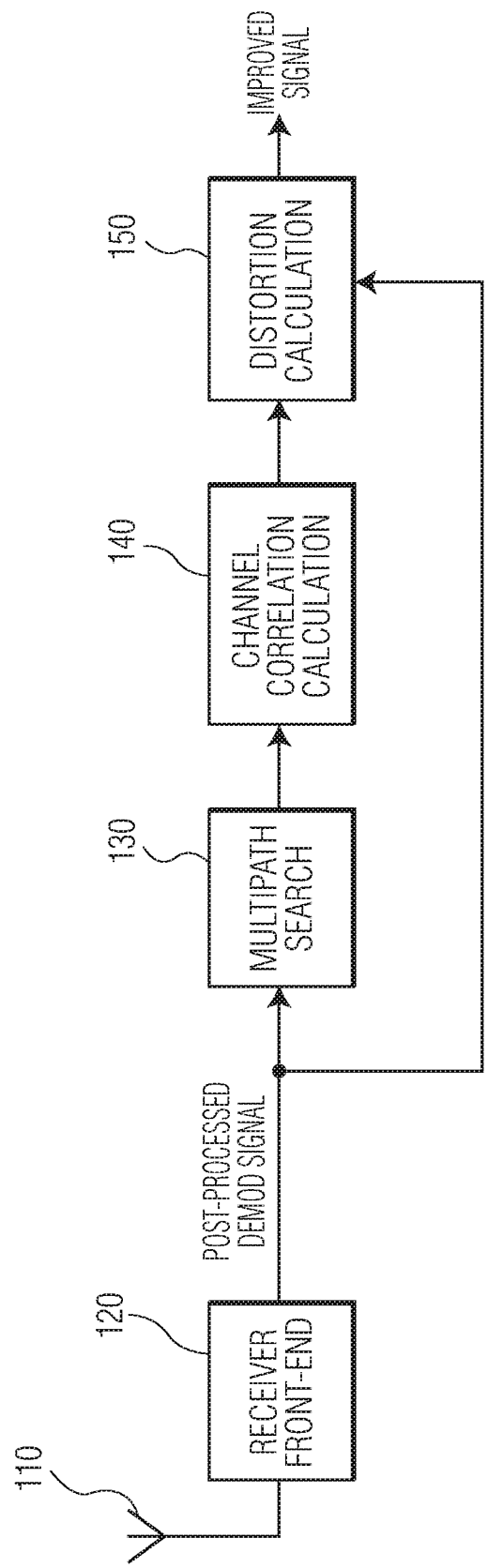
FIG. 1 is a system-level diagram illustrating an example of an RF receiver including multipath search, channel correlation and distortion calculation, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION OF CERTAIN EXAMPLES

Aspects of the present disclosure are believed to be applicable to a variety of different types of apparatuses, systems and methods involving RF (radio frequency) orthogonal frequency division multiplexed (OFDM) based receiver systems. In certain implementations, aspects of the present disclosure have been shown to be particularly beneficial when used in the context of OFDM receivers that are susceptible to being impaired by multipath reflections, and wherein channel state information is provided, for example, transmitted through known pilots on a known frequency grid via a configuration of the system's transmitter. While the present disclosure is not necessarily limited to such aspects, an understanding of specific examples in the following description may be understood from discussion in such specific contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Certain specific examples of the present disclosure are directed to aspects involving frequency interpolation methods applicable to an OFDM receiver where channel state information is provided via through pilots that may be associated with a frequency grid. As applied, for example, in connection with OFDM-based radio and video broadcasting systems which may use such pilot-based transmissions, example aspects are directed to tracking the individual gain and delay of each multi-path reflection including the channel impulse response and calculating one or more channel covariance matrices per OFDM symbol to derive optimal interpolation coefficients. These coefficients may then be used to improve suppression of noise attributable to multipath interference. A pilot in this context may include a pilot that is present in the received OFDM symbol and/or to a pilot that is time-interpolated from future and past OFDM symbols (e.g., via Wiener-Hopf techniques for interpolating the channel at subcarriers from pilots present in the OFDM symbols and pilots that are time-domain interpolated).

In more specific embodiments, as may be used for example in systems such as DRM/CDR (Digital Radio Mondiale/Convergent Digital Radio) and DVB-T/T2 (Digital Video Broadcasting Terrestrial), this improvement in noise suppression is associated with the channel covariance which instead of assuming strictly a fixed (model-based) function, according to the present disclosure the filtering is adaptive to allow increased levels of noise suppression, for example, in the DRM case, a 1.2 dB improvement on a long echo channel.

In such specific examples, the interpolation coefficient filters may depend only on the realization of the multipath components' gain and delay and therefore effecting suppression of the noise optimally between the multipath components. In yet other related embodiments, further significant improvements may be realized in similar long echo channels (single-frequency network-use cases) for CDR and DVB-T/T2 and also for other system types where multipath interference is addressed via less ideal approaches.

Accordingly, such adaptive processing in accordance with aspects of the present disclosure permits for significant improvements in suppression of noise related to multipath and in certain specific examples may realize optimal results for any given channel profile due to its adaptive (multipath-tracking) nature. In certain other embodiments where such adaptive multipath-tracking aspects are used in combination with time-based interpolation methods/filters (as discussed hereinbelow), such improvements may be even more pronounced.

In a more specific example, radio and/or video broadcasting systems, such as DRM/CDR and DVB-T/T2, are implemented with such pilot-based OFDM transmission. In some embodiments, an example method tracks the individual gain and delay of each multi-path reflection including the channel impulse response and calculates channel covariance matrix per OFDM symbol and derives optimal Wiener interpolation coefficients, which allows missing subchannels to be restored through interpolation. As indicated above, systems and methodology are examples and not intended to necessarily limit the disclosure or how various aspects may be used in accordance with the present disclosure.

In other specific examples related to and in some instance building on the above-noted aspects, embodiments of the present disclosure involve an RF (radio frequency) receiver, tracking multipath gains and delays of multipath reflections corresponding to an OFDM transmitted signal. One specific method in this context involves searching for multipath reflections to calculate channel correlation information, and also uses information gleaned from the time-domain evolution of channel impulse response data, to provide channel estimations with mitigation or cancellation of distortion in the received signal. As this distortion can cause missing subchannels, its recognition and cancellation may be important.

In yet other specific examples related to the above aspects, such adaptive tracking of the multipath signals facilitate recovery of missing subchannels by calculating channel-dependent optimal frequency domain interpolation and by using coefficients corresponding to gains and delays of each of the multipath reflections manifested by the OFDM signal. Further, where the OFDM signal carries data in OFDM symbols and these symbols suffer from multipath reflections when received, such methodology may be further implemented to track the multipath reflections over time, or via an evolution-based tracking of the multipath reflections. This may allow for a further step in which the channel covariance matrix of the received signal is calculated with an optimal set of interpolation coefficients in frequency direction(s) associated with the covariance matrix calculation. Further, by such evolution-based tracking of the multipath reflections, information associated with the existing multipath reflection may be readily established. This tracked information may then be filtered by extraction of impulse responses and by correlating the impulse responses of a current OFDM symbol with a complex conjugate version of the previous OFDM symbol.

In one particular example according to the present disclosure, tracking multipath reflections may involve convolving the channel impulse response (CIR) with a match filter (or averaging filter) to further concentrate the energy of a multipath component before identifying the existing multipath reflections. This filtering may be advantages because such processing (e.g., IFFT) and bandwidth limitations may smear the multipath components in time. Further, such convolving may include adaptively calculating a correlation model for frequency direction for at least one OFDM symbol in the received OFDM signal. In this example, the derivative of the convolved data is then taken and, based on this derivative, multipath reflection is determined to exist under certain conditions. For based on this derivative, multipath reflection may be determined to exist if, in the multipath reflection, a positive slope is followed by a negative slope and the distance between these slopes equals a length of a filter used to smooth the multipath reflection.

The results of the above example provide indications of the gains and delays of all the multipath reflections. This allows for the estimation of the true autocorrelation function for relevant lags ("lag" refers to a distance from an interpolated point to the nearest pilot position).

The above example may be part of an RF OFDM receiver which, including an RF OFDM transmitter, form a radio system which is transmits and receives signal using OFDM data and pilot symbols to transmit digital data.

Turning now to the drawings and relating to the above-disclosed aspects and embodiments, FIG. 1 illustrates an example showing a portion of an RF pilot-based OFDM receiver. The antenna 110 may receive multiple transmissions including the desired channel. The desired channel signal may include, along with the direct transmission, one or more multipath signals. The receiver front-end 120, along with various processing tasks, creates a demodulated signal of the desired channel. This signal is passed to the multipath search block 130 which searches for, and tracks, any received multipath signals included with the desired channel. Information discovered in the multi-path search block 130 (e.g., gains and delays) is passed to the channel correlation calculation block 140 which generates parameters/information needed to mitigate or cancel multipath distortion. The correlation calculation block 140 generated parameters/information is passed to the distortion calculation block 150 which performs the multipath distortion correction on the received signal, thereby improving it.

Figure 2:
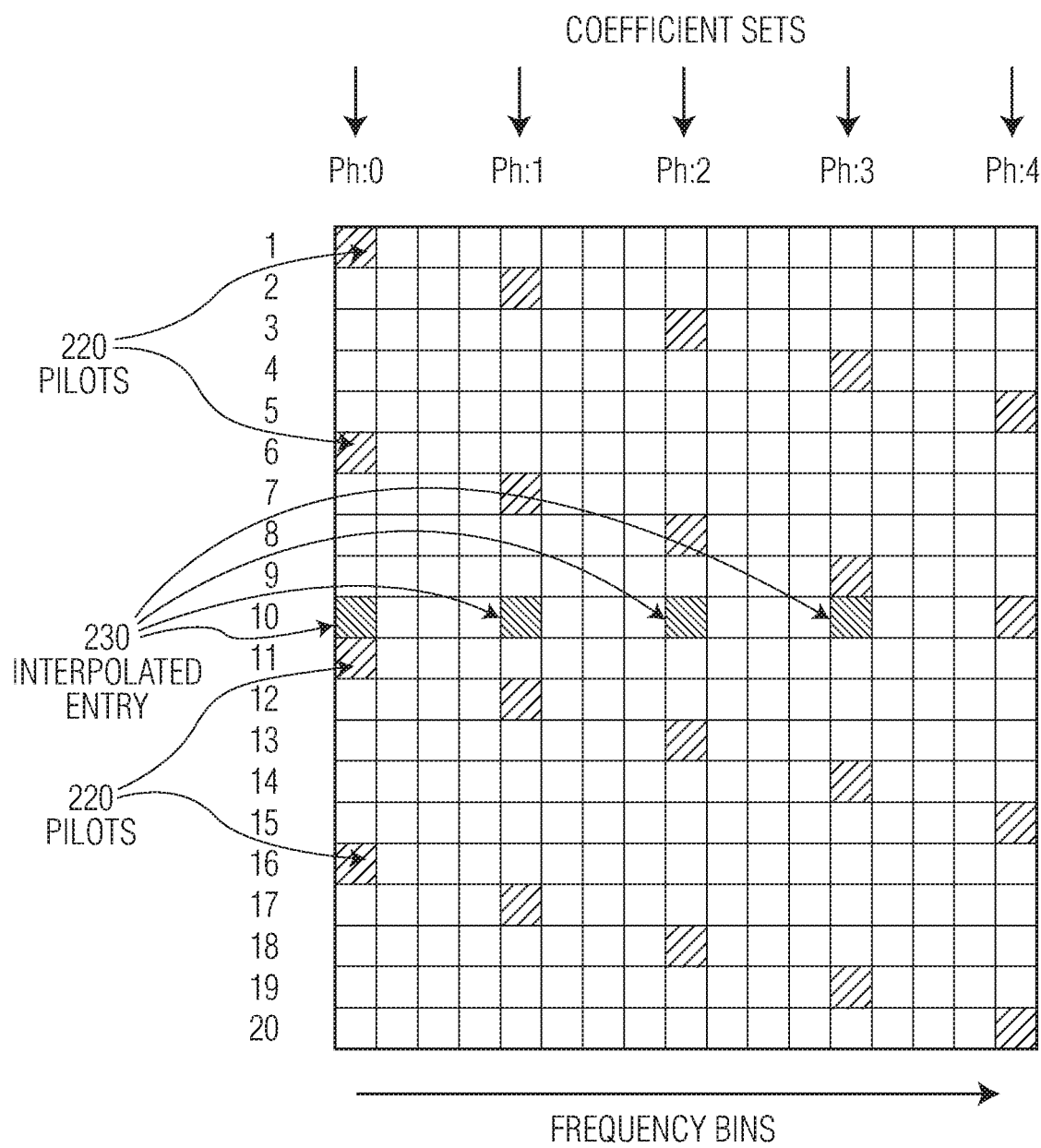
FIG. 2 is a frequency versus time chart showing an exemplary positioning of pilot tones within subcarriers along with interpolated positions, in accordance with the present disclosure.

FIG. 2 offers an example showing a pilot-based OFDM transmission presented with symbol number (or time) in the vertical axis and. frequency in the horizontal axis. The representation includes so-called gain references or pilots 220, which are known symbols and are transmitted with a certain periodicity in both the time domain and the frequency domain as shown. Also shown is an example of time interpolation. A four-tap filter is considered that combines pilots with Wiener filter coefficients that are calculated as a function of the time-variance of the channel due to Doppler spread. The squares marked as interpolated entry 230 are interpolated with the associated pilots 220 with coefficient sets (0, 1, 2, 3) respectively. The pilot that coincides with symbol 10 and coefficient set 4 is an existing pilot that is improved by recalculating that entry with the associated 4 pilots. Note that the channel for all subcarriers with no pilot need to be estimated.

Figure 3:
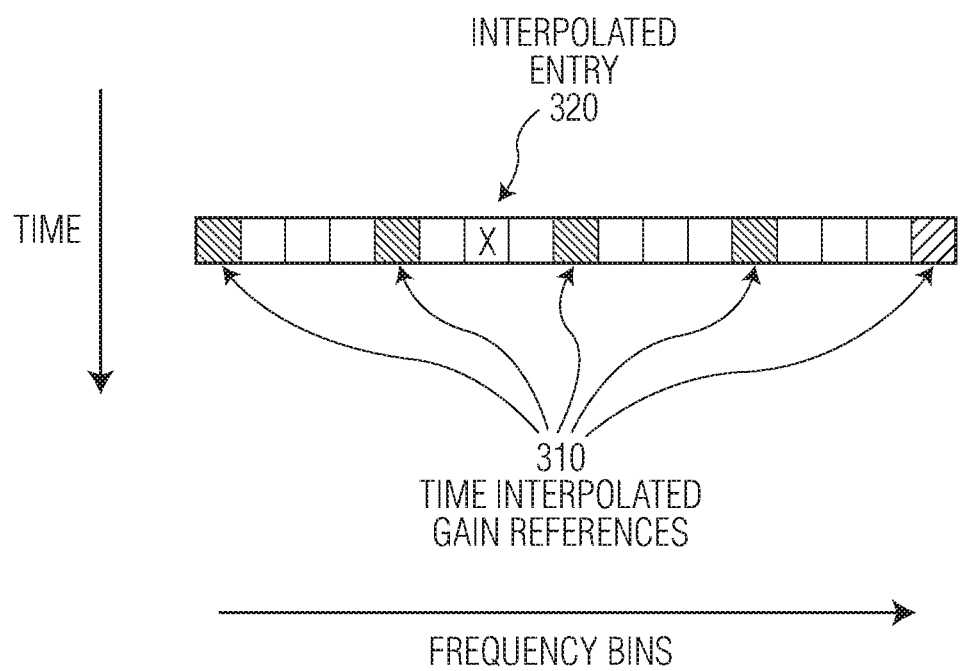
FIG. 3 is a frequency versus time chart showing subchannel interpolated positions, in accordance with the present disclosure.

The frequency interpolation task that follows a time interpolation step, calculates/interpolates the missing subcarriers for a particular OFDM symbol (in frequency direction) and filters the already interpolated subcarriers after time interpolation and is shown in FIG. 3.

As part of an example system may be a method that calculates the optimal frequency domain interpolation coefficients. To derive optimal interpolation coefficients, the channel covariance matrix calculation is needed. To this end, the frequency selectivity behavior due to the multipath nature of the wireless channel may need to be measured. This is captured in the autocorrelation function in frequency direction and is given as:

$$R_f = E\{H_f H_{f+\Delta f}^H\} \qquad (1)$$

In equation (3), $H_f$ represents the frequency domain channel transfer function. Equation (1) uses availability of the channel transfer function for all sub-carriers in the frequency domain. Therefore, this function cannot be directly calculated from the available gain references (pilots) after time interpolation due to the missing subcarriers. Other methods may be found that allow calculation of the equation (3) by other means.

Figure 4:
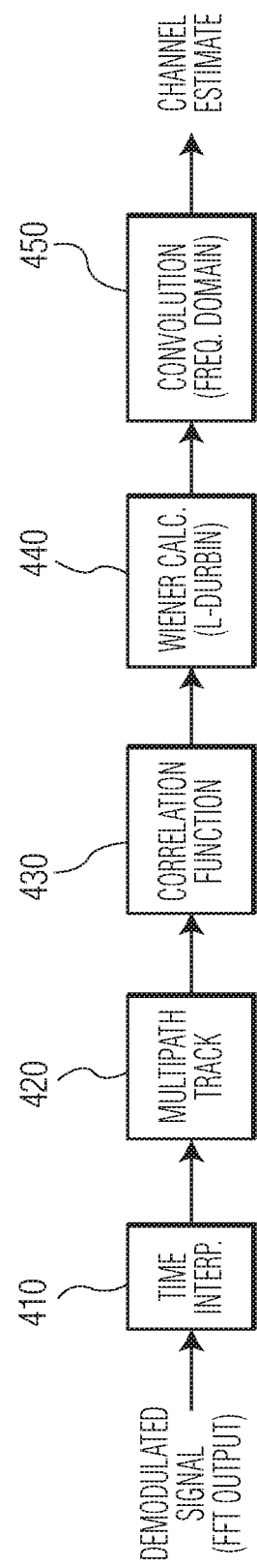
FIG. 4 is a system-level diagram illustrating an example of a channel estimation method based on optimal frequency interpolation, in accordance with the present disclosure.

As another example aspect of the present disclosure, FIG. 4 shows one way channel estimation may be performed. In FIG. 4, after proper time synchronization, where a proper FFT window is selected, the above method starts with extracting gain references in time direction and interpolates (block 410) missing gain references in time direction for a particular OFDM symbol as shown in FIG. 2. Note that symbol 10 has been interpolated as identified by interpolated entries 230. See also the interpolated entry 320 shown in FIG. 3. This step can be replaced with other time-interpolation schemes.

Other parts of the example method may include a block 420 to provide or calculate a power delay profile in terms of delays and gains by way of multipath tracking. The power delay profile is related to the correlation function via Fourier transform and, therefore, data characterizing the power delay profile or a model of the power delay profile is input to block 430. The power delay profile of block 420 may be configured to estimate the power delay profile by averaging time domain channel impulse response that is obtained from the time-domain interpolated gain references.

By tracking the time-domain evolution of the channel impulse response (e.g., multipath reflections of the wireless channel), equation (1) can be bypassed for calculating the true autocorrelation function and hence the true channel covariance matrix. If one knows the gains and relative locations of the multipath reflections, it is possible to calculate the true autocorrelation function or channel covariance matrix in the correlation function 430. The Wiener-Hopf calculation block 440 uses data from the autocorrelation function, it is possible to create the channel covariance matrix and solve the Wiener-Hopf equations, also in the frequency domain, to obtain optimal frequency interpolation coefficients. In the convolution block 450, the calculated interpolation coefficients derived in 440 can be used to estimate the channel optimally for a particular OFDM symbol (e.g., estimate the missing subcarriers) in the presence of noise.

Figure 5:
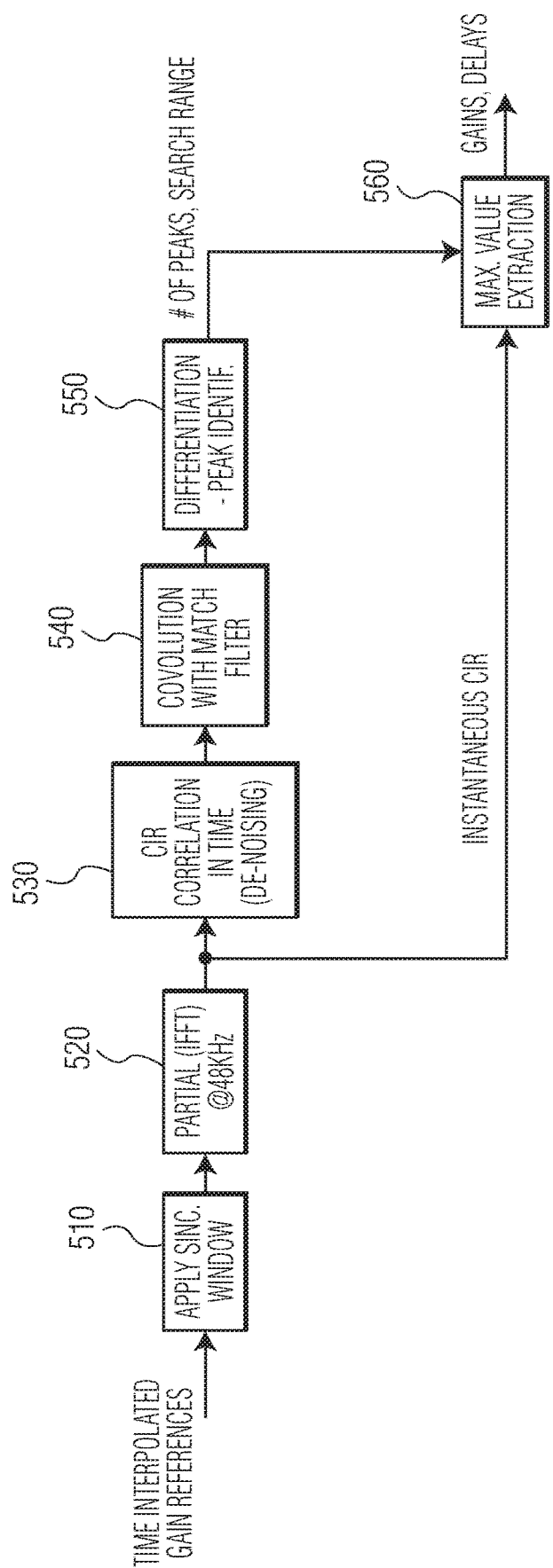
FIG. 5 is a system-level diagram illustrating an example of a multipath tracking method, in accordance with the present disclosure.

The multipath tracking block 420 is an example of a method allowing discovery of multipath reflections, thereby permitting for identification of the gains and delays and/or locations of the multipath components. Once they are found, those values can be used in calculating the true autocorrelation function or adaptive brick-wall filtering on the locations of the multi-path components. Example steps that lead to an effective tracking of multipath reflections are shown in FIG. 5.

After applying a sinc window 510 to the time interpolated gain references, to obtain the channel impulse response in time domain, an inverse FFT 520 is performed on these time interpolated gain references. These gain references 310 appear as seen in FIG. 3 are subsampled relative to all frequency bins with a certain ratio of $N_f$. This periodicity is a design parameter for network operators/broadcasters and a function of the maximum delay spread $\tau_{max}$ determined by a particular worst-case channel profile that one may want to cover, and the system sampling period $T_s$ and is given as $N_f \leq T_s/\tau_{max}$. The minimum IFFT size to obtain aliasing-free copies of the impulse response in time domain is $N_f \cdot B_w$. Here, $B_w$ refers to the used number of carriers (bandwidth). In one example, as seen in FIG. 5, a system sampling rate of 48 kHz is chosen for the DRM Car radio that satisfies this criteria. For a simplified implementation, the size of the IFFT may be chosen to be the smallest power of two that satisfies the minimum size specification.

Because the IFFT size is larger than the used bandwidth, performing the IFFT has a similar effect of convolving the wireless channel impulse response associated with the multipath reflections (Dirac-like behavior) with a sinc function in time domain. (Note in the frequency domain envisioned is a brick-wall filter that is equivalent in size to the used bandwidth that is being point-wise multiplied with the channel transfer function in frequency domain. The inverse FFT of this brick-wall filter is a sinc function. As the inverse Fourier transform of pointwise multiplication is equivalent to convolution, this sinc function will be convolved with the multipath reflections. Furthermore, the main lobe of the sinc function has a size that is equal to round(2·IFFTsize/$B_w$). This convolution spreads the energy of the reflections in time domain. It is desired to see Dirac-like behavior in time domain to focus the energy of the reflections to be able to easily identify their locations and gains and limit the interference between them due to the convolution. Note that a sinc function that performs point-wise multiplication with the channel transfer function in frequency domain is equivalent to convolution of the multipath reflections with a brick-wall filter in time domain. It is possible to minimize the width of this brick-wall filter to 1/IFFTsize (equal to the length of 1 sample duration in time domain). This step is denoted as block 510. Consequently, the window function coefficients in frequency domain can be calculated using equation (2).

$$F_w = sinc\left(f\frac{1}{IFFTsize}\right) \text{ with } f = K_{min} \cdots K_{max} \quad (2)$$

In (2), $K_{min}$ and $K_{max}$ refer to the minimum and maximum index of the used carriers.

Once the time domain impulse response is calculated with the IFFT, the result has $N_f$ copies due to up-sampling of the gain references with the same ratio. After time-interpolation, one has in the frequency domain for every Nf subcarriers one interpolated gain reference available. This follows as the interpolated gain references can be seen as a $N_f$-fold down-sampling of all subcarriers. These interpolated gain references are now upsampled with a factor $N_f$ by inserting zeros in frequency domain, and this zero insertion causes the copies of the Channel Impulse Response (CIR) in the time-domain. In an alternative example embodiment one can choose to have circuitry perform an IFFT only on the time-domain interpolated gain references and not the inserted zeros that represent the missing subcarriers; in which case one can use a smaller IFFT size and one does not obtain copies of the CIR, and the window-function (Eqtn. 4) may be applied to the corresponding positions of the time-domain interpolated gain references.

Figure 6:
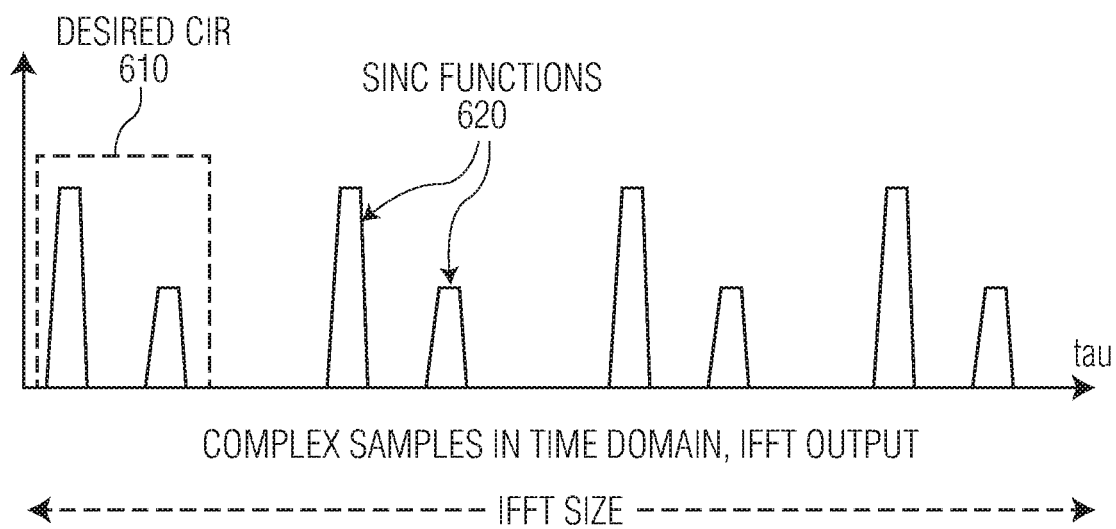
FIG. 6 is a time domain diagram showing an example of multipath reflections viewed in an IFFT, in accordance with the present disclosure.

FIG. 6 shows an example where subsampling ratio $N_f$ is 4, therefore there are four copies of the Channel Impulse Response and this may also apply to the immediately-preceding alternative example embodiment. The original "spectrum" near time 0 (desired CIR 610) is considered the "original" spectrum as the rest are simply copies of the same impulse response. The time domain response of the desired CIR is denoted with $h_{t,\tau}$ where t denotes time index (or OFDM symbol index), and $\tau$ denotes delays of multipath reflections per OFDM symbol. The multipath reflections appear as sinc functions 620 with lobes that have a certain width based on the ratio of the IFFT size versus the used bandwidth.

As it is desired to track the evolution of multipath reflections as a function of time, the extracted impulse responses may be filtered. For this purpose, the impulse response of the current OFDM symbol are correlated with the complex conjugate version of the previous in the following manner.

$$H_\tau = Real\{E\{h_{t,\tau}h_{t-1,\tau}^H\}\} \quad (3)$$

In equation (3), E represents the mean/expectation operator and Real implies that this computation is performed on the real component of the correlation in time direction. The superscript H refers to the complex conjugate operation. The expectation operator can be implemented with a first order IIR filter with the following equation.

$$y_t = \alpha \cdot x_t + (1-\alpha) \cdot y_{t-1} \quad (4)$$

In equation (4), $x_t = h_{t,\tau}h_{t-1,\tau}^H$ is the input to the IIR filter. This filtering needs to be performed per sample (per $\tau$) of the impulse response. The range to be covered in the $\tau$ dimension should match the range/length for the desired CIR. That is essentially the length of the guard interval as OFDM systems are designed to maintain CIR within the guard interval. Consequently, the number of IIR filters needed equals the length of the guard interval. Note that there is an implicit synchronization specification here as the multipath reflections of the desired CIR does not necessarily have to start from τ=0. In equation (4), α is the filter coefficient that determines the corner-frequency for the averaging filter. Correlating 530 the current impulse response with the complex conjugate of the previous impulse response can be considered as a de-noising step, because noise realization on current and previous impulse response are independent. Note that in case the absolute impulse response is averaged, no noise filtering is realized.

In this example embodiment, once the impulse response is averaged out in time direction, the next task is to identify the number of multipath reflections (in this example only 2), their gains and the delays (in τ dimension). The width of the sinc function that represents a single multipath component is also known. That is equal to round(2·IFFTsize/$B_w$). To be able to detect, the existing multipath reflections in time domain view, a match filtering or an averaging filter (a moving window with equal coefficients) with a length that matches exactly the main lobe (or width) of the multipath reflections or round (2·IFFTsize/$B_w$) may be used. This example embodiment uses an averaging window with equal coefficients and convolve the time domain view of the impulse response to emphasize the main lobes of the sinc function(s) corresponding to multipath reflections. This is shown as signal processing block 540.

Identifying existence of the multipath reflections may also stem from an assessment of the derivative 550 (e.g., at block 540)) of the convolution output. By calculating these parameters as part of the assessment and detecting the related slopes, an indication of multipath reflection may be provided. For instance, the assessment may indicate a multipath reflection to exist only if a positive slope is followed by a negative slope and the distance between these slopes equals the length of the filter. Because such a check is agnostic to the value of the slope, the strength and/or gain of the multipath reflection does not affect the detection performance. The data from the block 550, along with data from the IFFT block 520, is used in the max value extraction block 560, to extract the desired gains and delays.

Accordingly, these aspects associated with the example used in FIG. 5 may correspond with estimating or providing an estimate of the delay profile of the received signal that is based on time-averaging of instantaneous Channel Impulse Responses (CIR) estimate where (time-wise) most likely the multipath reflections in the instantaneous CIR are present. The knowledge obtained in the upper-branch of FIG. 5 is used to provide a confined search in the instantaneous CIR, in order to locate the gain and the delay of the multipath components as in the max value extraction block 560 of FIG. 5.

Figure 7:
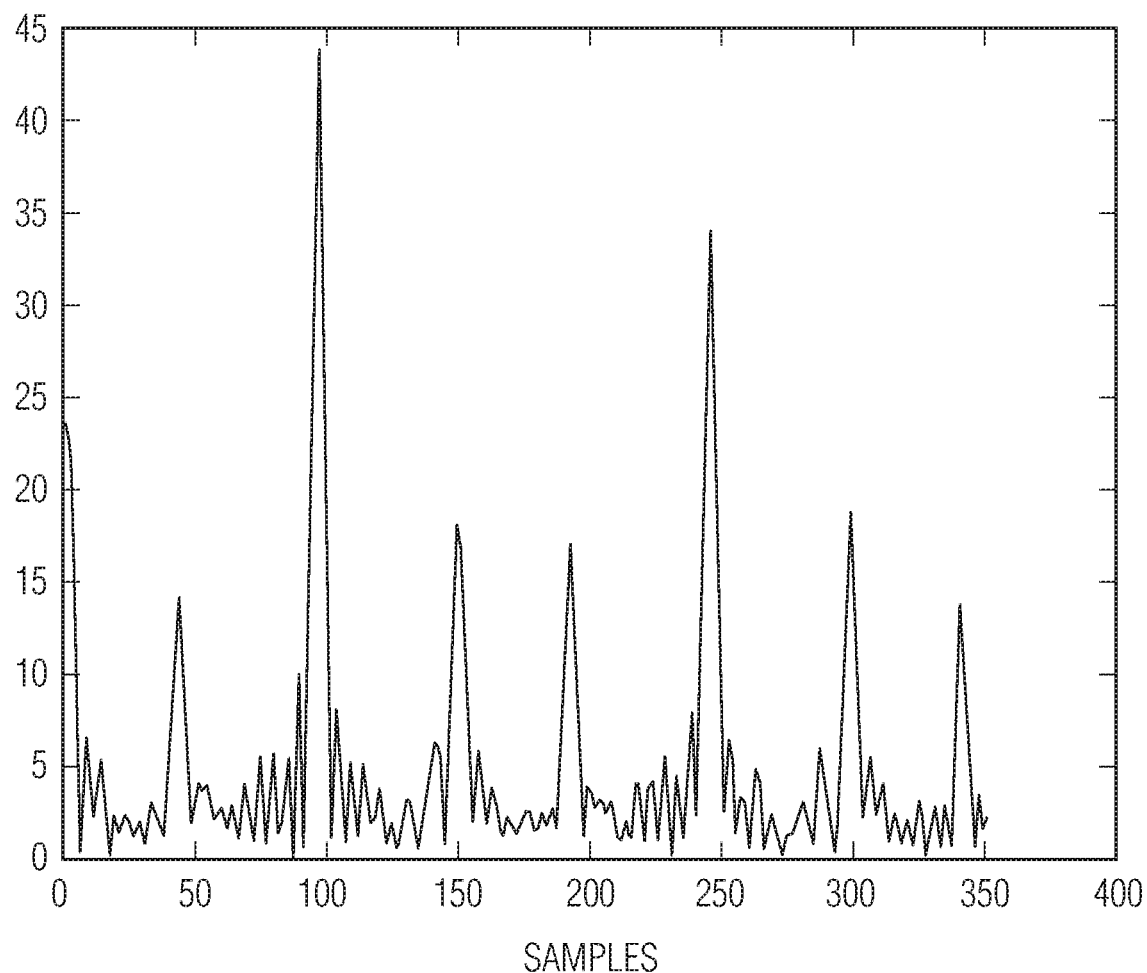
FIG. 7 is an exemplary chart showing instantaneous channel impulse response (CIR), in accordance with the present disclosure.

Continuing on in this example, if a multipath reflection is detected, the actual gain and delay of this peak is searched in the instantaneous channel impulse response and not on the averaged CIR. The reason for this is that the instantaneous CIR represents the current OFDM symbol that has to be estimated and the averaged CIR helps to identify the number of multipath reflections and where they are to be searched in the instantaneous CIR. FIG. 7 shows the instantaneous CIR for an example channel realization.

Figure 8:
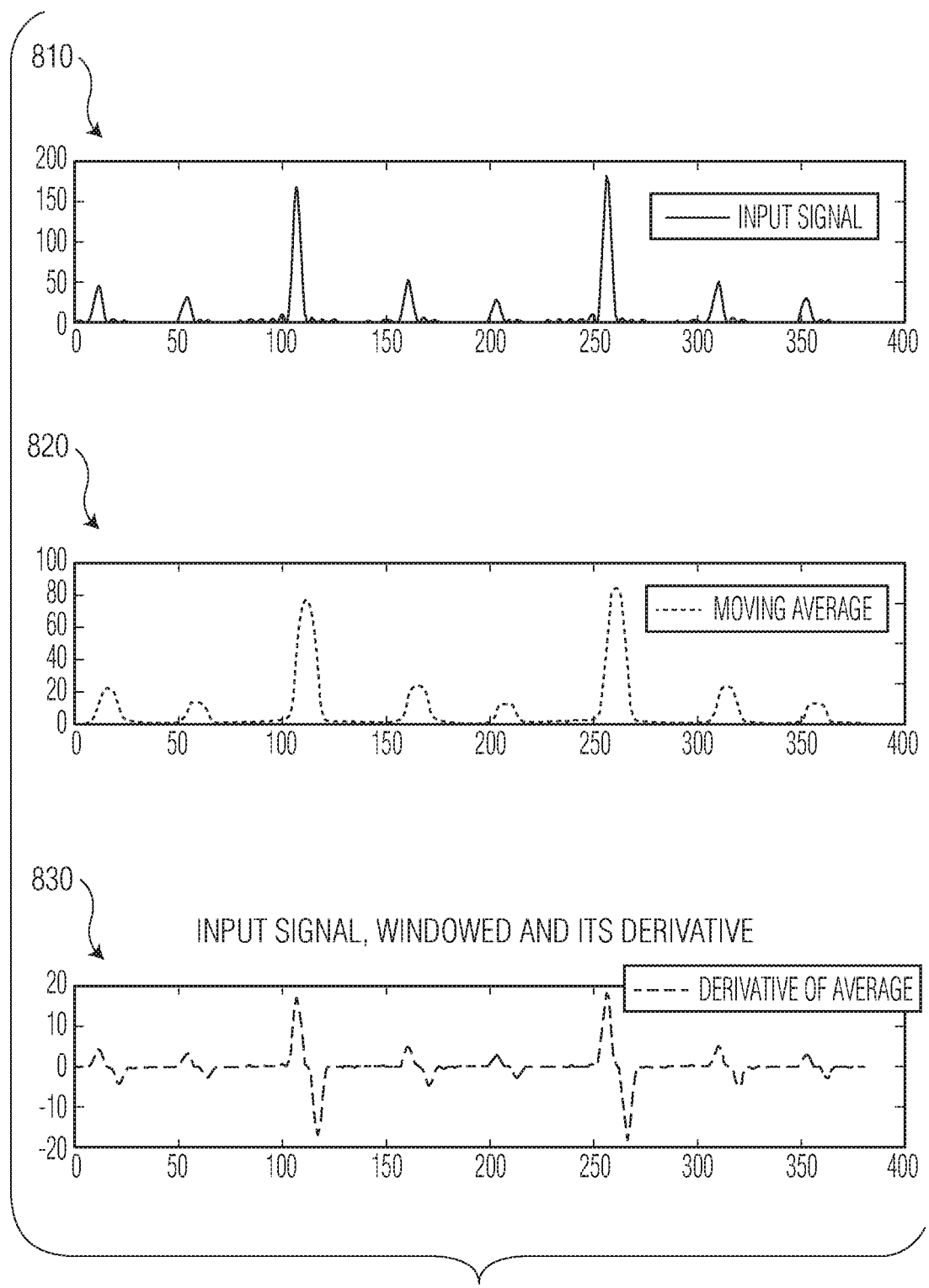
FIG. 8 is an exemplary chart showing aspects associated with the channel impulse response (CIR) and an averaging window, in accordance with the present disclosure.

FIG. 8 shows eight multipath reflections detected by the above example method. The upper plot 810 is the averaged CIR. The middle plot 820 shows after convolving the upper plot 810 with the moving average window with a length that equals the length of the main lobe of the multipath reflections i.e., (round(2·IFFTsize/$B_w$). The bottom plot 830 shows the differentiation of the middle plot 820. A simple logical check is performed by looking at the sign of the differentiation result. A positive slope (+) is always followed by a negative slope (−) with a distance that equals round (2·IFFTsize/$B_w$). This indicates a discovered multipath reflection.

In such instances where there are missing subcarriers, providing a calculation or estimation associated with equation (1) may be more burdensome due to the missing subcarriers. However, having ascertained such information on gains ($\rho_k$) and delays ($\tau_k$) of the K multipath reflections, the true autocorrelation function can be estimated as:

$$R_f(m) = \sum_{k=1}^{K} \rho_k^2 \cdot e^{-i2\pi \cdot m \cdot (\tau_k / IFFTsize)} \quad (5)$$

In equation (5), m denotes the lag for the autocorrelation function. The number of lags to be computed for the channel covariance matrix is $N_{taps} \cdot N_f$ where $N_{taps}$ refers to the number of taps for the interpolation filter and $N_f$ is gain reference periodicity after time interpolation. Therefore, the lag range is 0 ... $N_{taps} \cdot N_f - 1$. Note that due to a property of the Fourier transform, the convolution step in frequency domain is equivalent to pointwise multiplication in time domain. Accordingly, if the gains and locations of each multipath reflection is known, a brick-wall filter may be used on the instantaneous CIR in time domain as given in FIG. 9, which shows an example showing three multipath reflections with different delays ($\tau_1, \tau_2, \tau_3$). Such a brick-wall filter in time domain is equivalent to a sinc function in frequency domain. In connection therewith, in another specific example embodiment, the autocorrelation function may be calculated as a sum of sinc functions whose gains and delays are controlled by the estimated gains ($\rho_k$) and delays ($\tau_k$) of each multipath reflection and can be considered as a replacement to equation (5). Such formulation may be given as:

$$R_f(m) = \sum_{k=1}^{K} \rho_k^2 \cdot e^{-i2\pi \cdot m \cdot (\tau_k / IFFTsize)} \cdot sinc\left(\frac{m \cdot T_w}{IFFTsize}\right) \quad (6)$$

The lag range for m is exactly as defined above i.e., 0 ... $N_{taps} \cdot N_f - 1$ The optimal interpolation filter coefficients in frequency domain may be calculated or estimated using Wiener-Hopf relationships or equations as done in a way similar to the time interpolation filter calculation in equation (2). Note that the channel covariance matrix in frequency domain denoted as $R_{ff}$ is useful in this regard. The channel covariance matrix can be calculated as $R_{ff}(k,l) = R_f(k-l)$ using equation (6) where k,l=0 ... $N_{taps}-1$. Here $N_{taps}$ refers to number of taps corresponding to the frequency interpolation filter. The equation for optimal filter coefficients is given as:

$$w_f = R_{ff}^{-1} \cdot R_q \quad (7)$$

The coefficients calculated in equation (7) can be used to interpolate for the missing subcarriers by convolving with the output of the time-interpolated channel estimation.

Figure 9:
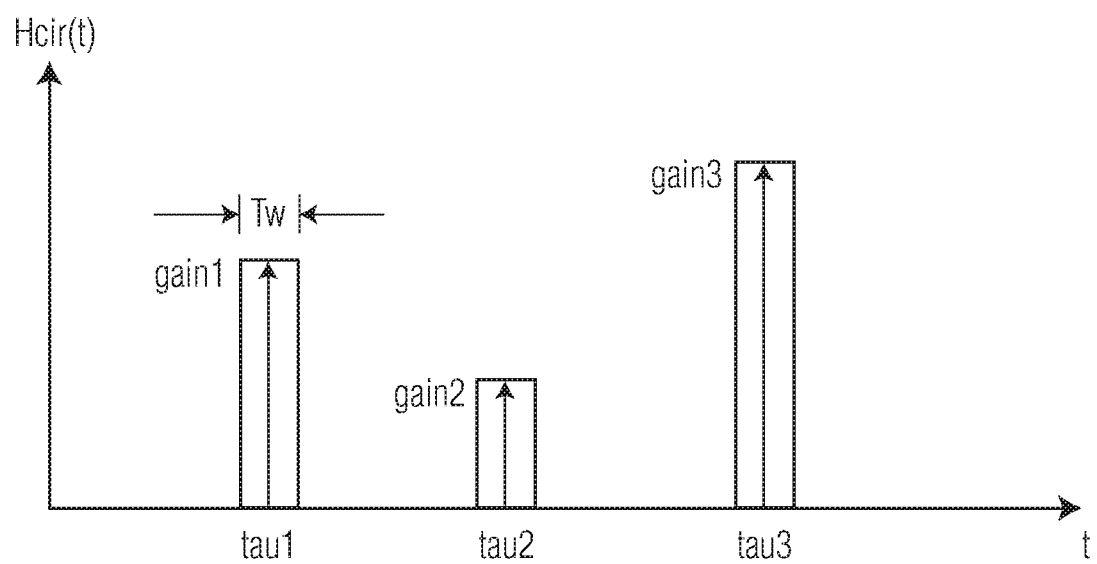
FIG. 9 is exemplary plot of multipath reflections with various delays, in accordance with the present disclosure.

In certain experimental/more-detailed examples in accordance with aspects of the present disclosure and involving at least one non-fixed channel covariance matrix, surprisingly impressive results have been realized. In such testing, conventional frequency interpolation schemes which rely on a fixed channel covariance matrix assumption (or a fixed model on the autocorrelation function in frequency domain) may be used as a reference point; an example in this regard may be a single brick-wall filter that may, for example, capture the width of the entire CIR. In accordance with the present disclosure, tracking of multipath reflections may include identification of relevant information (gains and delays) from the multipath reflections and allow adaptive brick wall filtering as shown in FIG. 9. Such channel dependent filtering enables (optimal) noise reduction and with noise between the brick-wall filters being filtered away and allowing for significantly better performance than a fixed correlation model. Testing has shown such performance improvements in terms of gain shown to be as much as 1.2 dB and, when used with pilot-based OFDM receivers, associated performance improvements in terms of baud rates, bit error rates and/or general-signal reception are realized.

The skilled artisan would recognize the various terminology as used herein. As examples, the Specification describes and/or illustrates aspects by way of various circuits with reference to terms such as blocks, modules, and/or other circuit-type depictions (e.g., reference numerals 410-450 of FIG. 4 depict a block/module as described herein). Such circuits or circuitry may be used together with other elements to exemplify how certain example embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 4 and 5. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm, method, or process as described at FIG. 4 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used to provide antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the figures may involve steps carried out in various orders, with one or more aspects of the embodiments herein retained, or may involve fewer or more steps. Such modifications do not depart from the true spirit and scope of various aspects of the disclosure, including aspects set forth in the claims

What is claimed is:

1. A method comprising:
in an RF (radio frequency) receiver, tracking multipath gains and delays of at least one of a plurality of multipath reflections corresponding to an orthogonal frequency division multiplexed (OFDM) signal, including data in OFDM symbols, received via a multipath transmission channel based on time-domain evolution of channel impulse response data associated with the transmission channel;
calculating a channel covariance matrix per each of the OFDM symbols and in response, deriving optimal interpolation coefficients for estimating therefrom one or more optimal channels; and
in response to said tracking multipath gains and delays and said calculating a channel covariance matrix, searching for multipath reflections to calculate channel correlation information, or correlation functions, and providing channel estimations, using frequency domain interpolation, for mitigation or cancellation of distortion in the received signal.

2. The method of claim 1, further including calculating channel-dependent optimal frequency domain interpolation by using coefficients corresponding to gains and delays of each of the plurality of multipath reflections manifested by the OFDM signal.

3. The method of claim 1, further including tracking the multipath reflections over time and in response, providing the channel covariance matrix calculation per OFDM symbol of the received signal with an optimal set of interpolation coefficients in frequency direction associated with the covariance matrix calculation per OFDM symbol.

4. The method of claim 1, further including tracking an evolution of the at least one of a plurality of multipath reflections as a function of time, and filtering by extraction of impulse responses and by correlating the impulse responses of a current OFDM symbol with a complex conjugate version of the previous OFDM symbol.

5. The method of claim 1, further including a correlation step involving tracking an evolution of the channel impulse response data as a function of time and establishing information associated with an existing one of said at least one of a plurality of multipath reflections.

6. The method of claim 1, further including tracking an evolution of the channel impulse response data as a function of time to establish information associated with an existing one of said at least one of a plurality of multipath reflections and applying a match filter to further concentrate energy associated with a multipath component.

7. The method of claim 1, further including identifying existence of the multipath reflections based on a calculated relationship between a convolution output and detection of slopes associated with peaks corresponding to the multipath reflections.

8. The method of claim 1, further including identifying or determining existence of the multipath reflections based on a convolution output from a filter and a calculated derivative with respect to time in order to find peaks corresponding to slopes associated with the multipath reflections, wherein a multipath reflection is determined to exist if, in the multipath reflection, a positive slope is followed by a negative slope and the distance between these slopes equals a length of a filter used to smooth the multipath reflection.

9. The method of claim 1, further including estimating or providing a delay profile by identifying or determining existence of the multipath reflections based on whether, in the multipath reflection, a positive slope is followed by a negative slope and the distance between these slopes is associated with a length of a filter used to smooth the multipath reflection.

10. The method of claim 1, further including wherein adaptively calculating a correlation model for frequency direction for at least one OFDM symbol in the received OFDM signal in response to a detected change of gain and/or delays of the multipath reflections.

11. The method of claim 1, further including calculating an autocorrelation function for relevant lags associated with a particular subcarrier for which interpolations are to be calculated, wherein "lag" refers to a distance from an interpolated point to a position of a pilot symbol, associated with the received OFDM signal, being nearest.

12. The method of claim 1, wherein the RF (radio frequency) receiver is part of a radio system also having a transmitter, and further including the transmitter transmitting the OFDM signal.

13. The method of claim 12, further including the transmitter transmitting the OFDM signal as a digital broadcast signal including OFDM symbol sets including data symbols and pilot symbols transmitted using a plurality of subcarriers.

14. The method of claim 1, further including identifying or determining existence of the multipath reflections based on a relationship between a convolution output and detection of slopes associated with the multipath reflections, wherein a multipath reflection is determined to exist in response to discerning from slopes in signals associated with the multipath reflection, and wherein a magnitude or gain of any particular multipath reflection does not mitigate said determination.

15. An apparatus comprising:
an RF (radio frequency) receiver to
track multipath gains and delays of at least one of a plurality of multipath reflections corresponding to an orthogonal frequency division multiplexed (OFDM) signal, including data in OFDM symbols, received via a multipath transmission channel based on time-domain evolution of channel impulse response data associated with the transmission channel; and a logic circuit to, in response to indications of the gains and delays,
calculate a channel covariance matrix per each of the OFDM symbols and in response, deriving optimal interpolation coefficients for estimating therefrom one or more optimal channels, and
search for multipath reflections and calculate channel correlation information, or correlation functions, to provide channel estimations, using frequency domain interpolation, for mitigation or cancellation of distortion in the received signal.

16. The apparatus of claim 15, further including calculating channel-dependent optimal frequency domain interpolation by using coefficients corresponding to gains and delays of each of the plurality of multipath reflections manifested by the OFDM signal.

17. The apparatus of claim 15, wherein the OFDM signal carries data in OFDM symbols, and further including tracking the multipath reflections over time and in response, providing a channel covariance matrix calculation per OFDM symbol of the received signal with an optimal set of interpolation coefficients in frequency direction associated with the covariance matrix calculation.

18. The apparatus of claim 15, further including tracking an evolution of the at least one of a plurality of multipath reflections as a function of time, and filtering by extraction of impulse responses and by correlating the impulse responses of a current OFDM symbol with a complex conjugate version of the previous OFDM symbol.

19. The apparatus of claim 15, further including tracking an evolution of the channel impulse response data as a function of time and establishing information associated with an existing one of said at least one of a plurality of multipath reflections.

20. The apparatus of claim 15, wherein the logic circuit is further to identify or determine existence of the multipath reflections based on a relationship between a convolution output and detection of slopes associated with the multipath reflections, wherein a multipath reflection is determined to exist in response to discerning from slopes in signals associated with the multipath reflection, and wherein a magnitude or gain of any particular multipath reflection does not mitigate said determination.

* * * * *